United States Patent
Sikora et al.

(10) Patent No.: US 12,474,264 B2
(45) Date of Patent: Nov. 18, 2025

(54) METHOD AND DEVICE FOR DETERMINING THE REFRACTIVE INDEX OF A SURFACE REGION OF AN OBJECT

(71) Applicant: Sikora AG, Bremen (DE)

(72) Inventors: Harald Sikora, Bremen (DE); Armin Holle, Achim (DE)

(73) Assignee: SIKORA AG, Bremen (DE)

( * ) Notice: Subject to any disclaimer, the term of this patent is extended or adjusted under 35 U.S.C. 154(b) by 267 days.

(21) Appl. No.: 18/026,708

(22) PCT Filed: Aug. 17, 2021

(86) PCT No.: PCT/EP2021/072820
§ 371 (c)(1),
(2) Date: Mar. 16, 2023

(87) PCT Pub. No.: WO2022/058112
PCT Pub. Date: Mar. 24, 2022

(65) Prior Publication Data
US 2024/0369480 A1  Nov. 7, 2024

(30) Foreign Application Priority Data

Sep. 17, 2020  (DE) .................... 10 2020 124 261.1

(51) Int. Cl.
*G01N 21/41*  (2006.01)
*G01N 21/3581*  (2014.01)

(52) U.S. Cl.
CPC ..... *G01N 21/4133* (2013.01); *G01N 21/3581* (2013.01); *G01N 2201/0221* (2013.01)

(58) Field of Classification Search
CPC .......... G01N 21/4133; G01N 21/3581; G01N 2201/0221; G01N 21/274
(Continued)

(56) References Cited

U.S. PATENT DOCUMENTS

2008/0034602 A1*  2/2008  Schwarz ............ G01N 21/8806
                                                           33/700
2015/0316764 A1* 11/2015  Hunter ............... G02B 27/0087
                                                           359/558

FOREIGN PATENT DOCUMENTS

CN        119090949 A  * 12/2024
DE     102018104705 B4     9/2019
(Continued)

OTHER PUBLICATIONS

Japanese Patent Office; Notification of Reason for Refusal; Application No. P2023-516628; Dated: Aug. 6, 2024; 4 pages.
(Continued)

*Primary Examiner* — Md M Rahman
(74) *Attorney, Agent, or Firm* — Barclay Damon LLP

(57) ABSTRACT

A method for determining a refractive index in a surface region of an object from a production system which has not cooled to an ambient temperature includes emitting terahertz radiation from a transmitter at an angle of incidence to the surface region of the object. The terahertz radiation is reflected from the surface region of the object and received by a receiver. The refractive index of the surface region of the object from a ratio of the emitted and reflected terahertz radiation is determined using an evaluator in communication with the transmitter and the receiver. The influence of surface properties of the object on a portion of the reflected terahertz radiation is taken into account when determining the refractive index.

21 Claims, 2 Drawing Sheets

(58) Field of Classification Search
USPC .......................................................... 356/128
See application file for complete search history.

(56) References Cited

FOREIGN PATENT DOCUMENTS

| | | | | |
|---|---|---|---|---|
| DE | 102019101152 B3 * | 1/2020 | | |
| DE | 102018128248 A1 | 5/2020 | | |
| DE | 202020005529 U1 * | 12/2021 | | |
| DE | 102018128248 B4 | 3/2023 | | |
| EP | 2751547 A1 * | 7/2014 | ......... | G01N 21/3504 |
| EP | 3317070 | 5/2018 | | |
| JP | 1996285769 A | 4/1998 | | |
| JP | 2001-34173 A | 2/2001 | | |
| KR | 10-2015-0082318 A | 7/2015 | | |
| KR | 10-2017-0011303 A | 2/2017 | | |
| KR | 10-2018-0040636 A | 4/2018 | | |
| WO | 2016139155 A1 | 9/2016 | | |
| WO | 2017000933 A1 | 1/2017 | | |

OTHER PUBLICATIONS

PCT/EP2021/072820; International Search Report and Written Opinion; mailing date Nov. 8, 2021 (9 pages).

PCT/EP2021/072820; English Translation of International Search Report and Written Opinion; mailing date Nov. 8, 2021 (2 pages).

* cited by examiner

METHOD AND DEVICE FOR DETERMINING THE REFRACTIVE INDEX OF A SURFACE REGION OF AN OBJECT

CROSS REFERENCE TO RELATED INVENTION

This application is a national stage application pursuant to 35 U.S.C. § 371 of International Application No. PCT/EP2021/072820, filed on Aug. 17, 2021, which claims priority to, and benefit of, German Patent Application No. 10 2020 124 261.1, filed Sep. 17, 2020, the entire contents of which are hereby incorporated by reference.

TECHNOLOGICAL FIELD

The invention relates to a method and a device for determining the refractive index of the surface region of an object, such as a heated strand-like or plate-like object, coming from a production system and which has not yet completely cooled to ambient temperature.

BACKGROUND

In extrusion systems, for example, strand-like or plate-like plastic objects are produced and conveyed along a conveying direction, for example through cooling lines, until they have completely cooled to ambient temperature and are correspondingly fully hardened. Immediately after leaving the extrusion system and over an additional region of the conveyor line, such objects have not yet fully cooled and therefore hardened.

From WO 2016/139155 A1 and DE 10 2018 128 248 A1, methods and devices are known with which the refractive index of strand-like or plate-like plastic objects can be determined by irradiating the objects with terahertz radiation and receiving the terahertz radiation reflected by the objects. This is a mean refractive index over the cross-section of the object or the irradiated section of the object. On this basis, geometric parameters of the object, for example a wall thickness of pipes, can be reliably determined even if the refractive index is initially unknown.

In particular when measuring the objects just after leaving the extrusion system, the geometric parameters ascertained in this way may, however, deviate from the actual geometric parameters when the object is in a completely cooled state. More reliable results could be obtained if the refractive index and geometric parameters were determined later when the object has cooled down completely and hardened. On the other hand, it is desirable to determine the geometric parameters as quickly as possible after leaving an extrusion system, for example, in order to be able to intervene in the production process as quickly as possible if the parameters are wrong and thereby minimize scrap.

There is therefore a need to enable accurate determination of the refractive index even if the object is measured in a state that has not yet completely cooled and therefore hardened.

The methods for determining the refractive index described at the onset and known from the prior art are also not optimally suited for reliably determining the refractive index, for example with portable measuring devices, so-called handheld units. There is therefore an additional need to make it possible to reliably determine the refractive index even in such applications.

Proceeding from the explained prior art, the object of the invention is therefore to enable the refractive index to be reliably determined even when the object is in a not yet completely cooled state.

BRIEF SUMMARY OF THE INVENTION

An embodiment of a method for determining a refractive index of a surface region of an object includes emitting terahertz radiation at an angle of incidence to the surface of the object. The terahertz radiation reflected from the surface of the object is received and the refractive index in the surface region of the object is determined from the ratio of the radiated and reflected terahertz radiation. When determining the refractive index, an influence of the surface properties of the object on the portion of reflected terahertz radiation is taken into account.

An embodiment of a device for determining a refractive index of a surface region of an object includes a transmitter for transmitting terahertz radiation at an angle of incidence to the surface of the object and a receiver for receiving the terahertz radiation reflected from the surface of the object. The device further includes an evaluation apparatus which is structured to determine the refractive index in the surface region of the object from the ratio of irradiated and reflected terahertz radiation. The evaluation apparatus is also structured to take into account an influence of the surface properties of the object on the portion of reflected terahertz radiation when determining the refractive index.

The object investigated according to the invention is in a heated state coming from a production system and has not completely cooled to ambient temperature. Accordingly, it may have viscous components in its interior which have not yet fully hardened, and which only harden over the course of additional cooling. The surface region of the object, on the other hand, is already hardened. Over the course of additional cooling and therefore hardening, the material shrinks. The production system can, for example, be an extrusion system. The object can accordingly be an object extruded in an extrusion system. The object may be, for example, a plastic object. The object may be a pipe, for example. In addition, the object may be conveyed along a conveying direction during terahertz irradiation according to the invention, for example, a strand-like object along its longitudinal axis. To this end, the device according to the invention may have a conveying apparatus. In addition, the device according to the invention may also comprise the object itself.

In an embodiment, terahertz radiation is emitted to the surface of the object at an angle of incidence assumed to be known. The surface of the object reflects the incident terahertz radiation at least partially depending on its reflectivity. The reflected terahertz radiation is received by a receiver. The terahertz radiation can, for example, lie within a frequency range of 10 GHz to 3 THz. It can be so-called millimeter waves. A transmitter emitting the terahertz radiation and a receiver receiving the reflected terahertz radiation may be arranged substantially at the same location. For example, they may be integrated together in a transceiver.

The invention is firstly based on the concept that the refractive index can be reliably determined in the already largely cooled and therefore hardened surface or surface region of the object. This in turn is based on the insight that an object which has not yet cooled down completely still has viscous portions, wherein there is a narrow transitional region between these viscous portions and the already hardened components, the so-called recrystallization zone.

Overall, there are therefore three different types of layers whose properties with respect to density and strength, and therefore also with respect to the refractive index, have significant differences. If a mean refractive index is ascertained over the entire cross-section of an object that still has viscous portions in the way described at the onset with respect to the prior art, this can therefore yield refractive index values that do not correspond to the refractive index of the material in the fully hardened state, in particular with regard to the still viscous components. This can correspondingly have a distorting effect on the determination of geometric parameters such as the wall thickness of pipes.

Investigations by the applicant have revealed that, over the course of further cooling completely and therefore hardening, a pipe which still has viscous portions, both the length as well as the diameter of the pipe only change negligibly, that is, less than 1%, while cooling further to ambient temperature. Nevertheless, a shrinkage of the pipe material of approx. 10% can be ascertained over the course of complete cooling and hardening. It can be concluded therefrom that this shrinkage is substantially all caused by the still viscous portion of the material of the object. Since the refractive index of a material changes with the density of the material, determining a mean refractive index of objects that still have viscous portions therefore leads to potential measurement errors. This can be avoided by measuring the refractive index in the surface region of the object that has already completely cooled and therefore hardened as provided according to the invention.

To measure the refractive index in the surface region, the familiar Fresnel equations are always used with the help of which the refractive index in the surface region, in particular at the surface of the object, can be calculated from the ratio of the terahertz radiation reflected from the surface of the object to the terahertz radiation emitted to the surface given a known angle of incidence. The required reflectivity of the object, that is, the ratio of reflected radiant power to irradiated radiant power, can be ascertained from the portion of received reflected radiation if the irradiated radiant power is known. The reflectivity describes a mathematical relationship between the refractive indices in the surface region of the object and the environment of the object. The refractive index of the environment of the object is known and can be assumed to be 1 for air. The angle of incidence can be 0° in the simplest case, i.e. the normal incidence of the radiation. The Fresnel equations can be simplified to:

$$R = \left| \frac{n_1 - n_2}{n_1 + n_2} \right|^2$$

with R: reflectivity $n_1$: refractive index of the environment of the object (1 for air)

$n_2$: refractive index of the surface region of the object.

Additional investigations by the inventors have, however, revealed that the use of this method for determining the refractive index of a heated strand-like or plate-like object coming from a production system which has not yet completely cooled to ambient temperature using terahertz radiation is very complex. This holds true in particular for determining the portion of reflected radiation in relation to the incoming radiation. It was revealed that the level of intensity of incoming terahertz radiation varies significantly with the distance from the object and the portion of terahertz radiation reflected back from the surface depending on the alignment and, in particular, the surface of the object.

The distance from the object and any curvature can be effectively set and taken into account using a prudent measurement setup. Things are different with the surface of the object which can scarcely be influenced within the context of the measuring setup. To overcome this problem, which exists in particular when terahertz radiation is used, it is provided that an influence of the surface properties of the object on the portion of reflected terahertz radiation is taken into account in the determination of the refractive index according to the invention. This allows influences by the surface that change the reflected portion to be taken into account, and corresponding distortions of the result of determining the refractive index can be avoided. For example, quite perpendicular irradiation and therefore reflection of the terahertz radiation, i.e. at an angle of incidence of 0°, can always thereby be achieved. As an input variable in determining the refractive index with Fresnel equations, a reliably set angle of incidence even with difficult or unknown surface conditions of the object is highly important.

It should be noted that the refractive index also depends on the frequency of the employed terahertz radiation. To the extent that the refractive index is mentioned here, it refers to the refractive index for the employed frequency of the terahertz radiation.

According to one embodiment, an influence of the surface topography of the object can be taken into account. This embodiment is based on the concept that, in particular, an irregular surface topography, for example dents, elevations, grooves or the like, causes the angle of incidence which is assumed to be known, for example 0°, to deviate from the actual angle of incidence and therefore the angle of reflection. This can be avoided by taking into account the surface topography.

According to another embodiment, a calibration can be performed for to an object with a known reflectivity, preferably a reflectivity of substantially 1. For the calibration, the surface of the object can be provided with a coating with a known reflectivity, preferably a reflectivity of substantially 1. The object used for the calibration can be the object to be determined with respect to its surface refractive index, that is, the object itself coming from the production system. It is then assumed that the surface topography of, for example, an object conveyed along a conveying direction during terahertz irradiation does not significantly change in terms of its conveying direction, for example its longitudinal direction. This can, for example, be well approximated for objects coming from an extrusion system. For example, for calibration purposes, the surface of the object to be measured can be treated as if it has a defined reflectivity, preferably as high as possible, for example a reflectivity of 1. For example, the coating can be a foil coating or a spray coating. A foil could for example be a thin metal foil. A spray coating could for example be a water spray coating, or a coating with a different liquid with a high reflectivity.

If a measurement according to the invention is carried out under a certain alignment of the transmitter (and receiver) for the terahertz radiation, the (actual) angle of incidence of the terahertz radiation can be deduced from the reflected portion of radiation, since the reflected portion of radiation at a normal incidence would have to correspond to the known reflectivity of, for example, 1. If there are any deviations here, a deviation from the assumed angle of incidence of 0° can correspondingly be deduced. It would also be conceivable to use the surface provided in this way to find the normal incidence by correspondingly realigning the transmitter (and receiver) by searching for the alignment of the transmitter (and receiver) at which the reflected radiation portion most corresponds to the known reflectivity, for example about 1. Calibration with the actual object to be measured provides the best results since calibration is done using the actual surface topography of the object. However, if it can be assumed to a good approximation that the shape of the object, including its surface topography, corresponds to another object with a known reflectivity, for example a metal strand, in particular a metal pipe or a metal plate, such an object differing from the object to be measured could also be used for the calibration. The alignment of the transmitter and receiver relative to the object to be used for calibration (distance, etc.) must very precisely correspond with the object that is actually to be measured. The described calibration can be performed both before and after determining the refractive index of the untreated object according to the invention. In order to avoid influence by a surface treatment on the result of determining the refractive index, it may be preferable to perform the calibration after determining the refractive index of the untreated object according to the invention. In this case, there is naturally no realignment of the transmitter and receiver.

According to another embodiment, terahertz radiation can be emitted to different locations on the surface of the object and/or at different angles of incidence to the surface of the object, wherein the reflected terahertz radiation is received, and wherein the refractive index is determined from the portion of reflected terahertz radiation with the greatest intensity. The maximum reflected radiant power is therefore sought with different alignments of the transmitter (receiver) for the terahertz radiation, that is, the normal incidence is sought. It is then assumed that around the maximum reflected radiant power, the angle of incidence substantially corresponds to 0°. According to another embodiment in this regard, a transmitter (and a receiver) for the terahertz radiation can be pivoted while transmitting the terahertz radiation around at least one pivot axis, and/or rotated around the object. In principle, circular orbits around a tubular object, and one-dimensional or two-dimensional changes of the angle of incidence or, for example, pendulum movements of the transmitter and receiver are conceivable. In each case, the maximum intensity can be ascertained and used as a basis for determining the refractive index. This can involve, for example, electronic or mechanical (rapid) tilting or spiraling of the transmitter and receiver. So-called galvoscanners are conceivable in this respect, for example. The maximum intensity can be determined in principle by a fit, for example the fitting of an envelope curve. This embodiment is also conceivable, in particular, for handheld units in which a corresponding support for the handheld unit can be dispensed with by using devices for quickly scanning the surface of the object, in particular quickly in comparison to unavoidable wobbling of the hand carrying the handheld device. It would of course also be conceivable in principle to provide a plurality of transmitters and receivers that all emit terahertz radiation to the surface of the object and receive reflected radiation, for example to different locations or distributed over the circumference of the object. The reflected radiation with the highest intensity could then be used for subsequent evaluation. In addition or alternatively to ascertaining the maximum, it would also be possible to determine the refractive index from the mean of the received reflected terahertz radiation, or from the quadratic mean of the received reflected terahertz radiation.

According to another embodiment, the mean refractive index can additionally be determined over the cross-section of the object. The mean refractive index can also be determined from terahertz radiation emitted to the object and reflected from the object, wherein in this case, radiation portions are also received and evaluated that have at least partially shone through the object and have been reflected from internal boundary surfaces of the object. The refractive index in this regard can be determined, for example, as described in WO 2016/139155 A1 or DE 10 2018 128 248 A1. Reference is accordingly made to these documents. The advantage is that the same measuring and evaluation apparatus can be used, in particular the same transmitters and receivers, as for determining the refractive index in the surface region of the object. It is understood that reflected signals from different surfaces can be discriminated over time or by frequency so that they can be individually evaluated for the measurement. The terahertz radiation can therefore be emitted in particular in FMCW mode (frequency-modulated continuous wave), or in pulse mode.

According to another embodiment, a comparison of the mean refractive index with the refractive index in the surface region of the object can be used to deduce shrinkage of the object over the course of its fully cooling to ambient temperature. The refractive index of a material is, among other things, dependent on temperature, in particular dependent on the density of the material. The portions that are still viscous have a lesser density than fully cooled regions so that the refractive index of such still viscous portions is also less. Accordingly, a difference between the mean refractive index, which also takes into account the viscous regions, and the surface refractive index, which does not take into account these regions, can be used to deduce the presence and portion of viscous regions and therefore reliably deduce expected shrinkage. This also holds true even if measuring occurs substantially just after exiting a production system, such as an extrusion system.

According to another embodiment, the expected intensity of the terahertz radiation reflected by the object can be determined using a finite element method and taking into account the radiation characteristic of a transmitter for the terahertz radiation as well as the distance of the transmitter to the object. This expected portion of reflected terahertz radiation corresponds in particular to the portion when there is normal incidence, i.e., the angle of incidence=angle of reflection=0°. If the actually measured reflected radiation deviates in its intensity from the expected value, a deviation from the assumed angle of incidence of 0° can be deduced, and this can be taken into account mathematically or corrected in the measurement setup.

According to another embodiment, the temperature in the surface region of the object can be determined from the determined refractive index in the surface region of the object. As explained, the refractive index is temperature-dependent. The temperature at the position or location of determining the refractive index can therefore be deduced from the determined refractive index.

According to another embodiment, the object may be a pipe, wherein terahertz radiation reflected from an inner surface of a wall section of the pipe is also received, and wherein the refractive index at the inner surface of the wall section is determined from the ratio of irradiated terahertz radiation and terahertz radiation reflected from the inner surface of the wall section. Of course, any damping of the terahertz radiation along the path through the material must also be taken into account.

According to another embodiment in this regard, the refractive index at the inner surface of the wall section can be used to determine the temperature at the inner surface of the wall section, and/or a temperature difference and/or a temperature gradient between the temperature of the inner surface of the wall section and the temperature in the (outer) surface region of the object. With such considerations of temperature, material (batch) changes can, for example, be detected and mathematically eliminated so that determining the refractive index according to the invention is independent of such changes. Moreover, considering a temperature difference or a temperature gradient is of particular interest with materials whose composition and therefore refractive index changes in a cross-section, for example through a pipe wall. This is the case, for example, with foamed material with strongly reflective boundary surfaces. In principle, the invention could also be used to determine refractive indices of a plurality of different material layers in a material, especially when there is a layered structure of the object. For this purpose, terahertz radiation reflected at the boundary layers between the layers can be evaluated for determining the refractive index.

It is also conceivable to determine a mean temperature of the object from the determined temperature in the surface region of the object and the determined temperature at the inner surface of the wall section. It would also be conceivable to determine a mean temperature of the object from the determined mean refractive index over the cross-section of the object. The two determined mean temperatures of the object can then be compared. From the comparison, it is possible to deduce changed material properties of the object, for example changes in the material, the admixture of components, a batch change, etc. It would also be conceivable to measure the temperature in the surface region of the object using a material-independent temperature measuring apparatus such as a pyrometer. The temperature at the inner surface of the wall section can be determined from the measured temperature and the determined temperature difference between the temperature of the inner surface of the wall section and the temperature in the surface region of the object. The absolute material-independent internal temperature can therefore be determined without having to provide a corresponding temperature measuring apparatus in the interior, which is also often impossible in practice.

From the absolute surface temperatures ascertained in this way on the outer and inner surfaces of, for example, a wall section of a pipe, it is possible to deduce material changes, such as admixtures of other materials, new batches, etc., by using a comparison with a mean temperature determined, for example, from the mean refractive index determined as explained above, if corresponding differences occur.

In principle, it would also be possible to additionally measure the surface optically, for example by means of laser radiation, in order to take into account the surface properties, in particular the surface topography, of the object. Any topographic structures of the surface could then be taken into account when determining the surface refractive index according to the invention. Laser triangulation, for example, could be used for measuring.

Providing a reflector on the side of the object opposite the transmitter and receiver can also be advantageous in order to prevent the measuring result from being influenced by the fluctuating intensity of the transmitter and fluctuating sensitivity of the receiver.

According to another embodiment, the device according to the invention can be a handheld device, i.e., a manually portable unit. In this way, the refractive index can be reliably determined from the outside in a very easy manner, wherein the invention also enables reliable measurement when using a handheld unit.

The device according to the invention, in particular its evaluation apparatus, may be structured to carry out the method according to the invention. Accordingly, the method according to the invention may be carried out by the device according to the invention.

BRIEF DESCRIPTION OF THE DRAWINGS

An exemplary embodiment of the invention is explained below in greater detail with reference to figures. Schematically.

The same reference numbers refer to the same objects in the figures unless indicated otherwise.

DETAILED DESCRIPTION OF THE INVENTION

Figure 1:
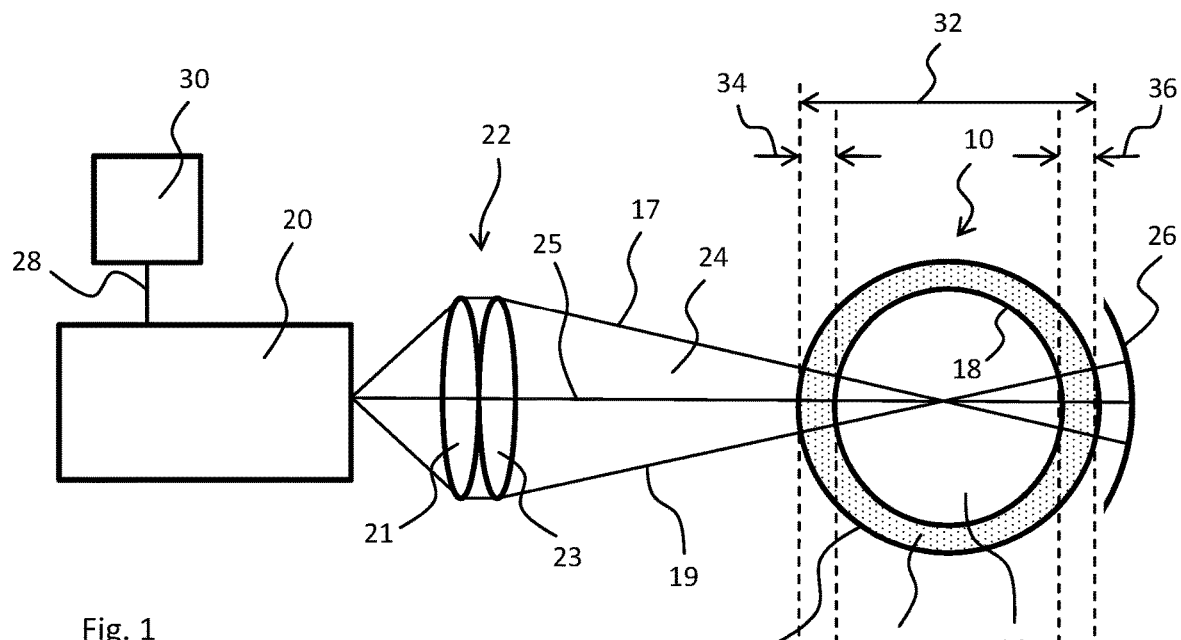
FIG. 1 shows a vertical sectional view of an embodiment of a device for determining the refractive index in a surface region of an object.
Figure 2:
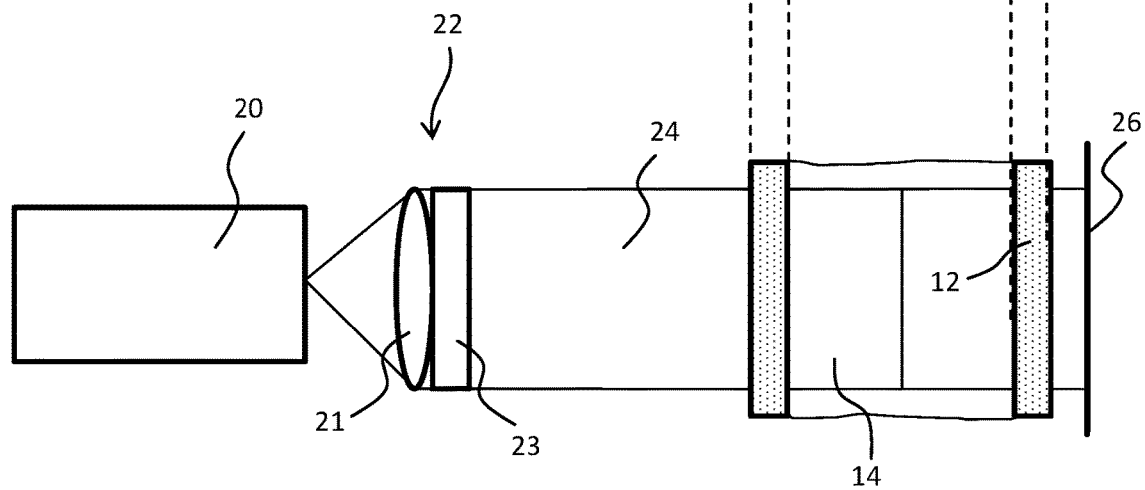
FIG. 2 shows another view of the embodiment of the device of FIG. 1.

FIG. 1 shows a device according to the invention in a vertical sectional view. FIG. 2 shows the device from FIG. 1 in a horizontal sectional view. In the exemplary embodiment shown in FIGS. 1 and 2, a heated object 10 coming from a production system, for example an extrusion system, which has not yet completely cooled to ambient temperature and which has already largely cooled and completely hardened in the region of its surfaces but still has viscous portions in its interior, is conveyed through the device by means of a suitable conveying apparatus, not shown in greater detail, along its central longitudinal axis (cylinder axis) extending perpendicular into the plane of the drawing in FIG. 1, and extending from bottom to top in FIG. 2. The object 10 in the present case is a cylindrical plastic pipe 10. The circular cross-section of the pipe 10 is easily discernible in the cross-sectional illustration shown in FIG. 1. In particular, the wall 12 of the pipe 10 possesses an outer surface 16 with a circular cross-section and an inner surface 18 also with a circular cross-section that delimits the hollow space 14.

The device according to the invention shown in FIGS. 1 and 2 also comprises a transmitter for emitting terahertz radiation and a receiver for receiving the terahertz radiation emitted by the transmitter and reflected by boundary surfaces of the pipe 10, wherein the transmitter and receiver are formed by a terahertz transceiver 20 in the depicted example. Of course, spatially separate, e.g. opposing, transmitters and receivers could also be provided. Reference sign 22 schematically represents radiation optics, in the present case comprising a biconvex lens 21 and a cylindrical lens 23 for terahertz radiation. Of course, other radiation optics are also conceivable. For example, a combined biconvex/cylindrical lens could be used. Moreover, it is discernible in FIGS. 1 and 2 that the optical axis 25 of the optical system formed by the transceiver 20 and the radiation optics 22 is perpendicular to the longitudinal axis of the pipe 10. The transmitter and receiver, or the transceiver 20, are furthermore connected by a line 28 to an evaluation apparatus 30. It is noted that the radiation does not have to be focused on the center of the pipe 10, and can have any other beam characteristic; in particular, parallel radiation could also be emitted. Moreover, it is possible for the emitted radiation to be controllably changeable in its direction by a suitable adjusting apparatus.

Reference sign 26 shows a cylindrically curved reflector for terahertz radiation with a longitudinal axis that runs in the direction of the longitudinal axis of the pipe 10 guided through the device. The curvature midpoint of the reflector 26 coincides with the curvature midpoint of the pipe 10 to be measured so that the focal line of the cylindrical reflector 26 coincides with the longitudinal axis of the pipe 10. The reflector 26 amplifies the measuring signal and allows improved discrimination of the different measuring signals received by the receiver. Moreover, it helps compensate for any fluctuations in the transmission power or reception sensitivity of the transmitter and receiver. It is noted that the reflector 26 can also possess a different geometry. It would also of course be possible to entirely dispense with the reflector 26.

With the device according to the invention shown in FIGS. 1 and 2, in particular the transceiver 20, terahertz radiation is emitted to the outer surface 16 of the pipe 10, if possible at an angle of incidence of 0°. Terahertz radiation reflected from the surface 16 of the object is in turn received by the transceiver 20. By means of the evaluation apparatus 30, the refractive index in the surface region, in particular the outer surface 16 of the pipe 10, is determined from the ratio of irradiated and reflected terahertz radiation. The refractive index can be calculated in particular in the manner explained above by using the Fresnel equations.

Figure 3:
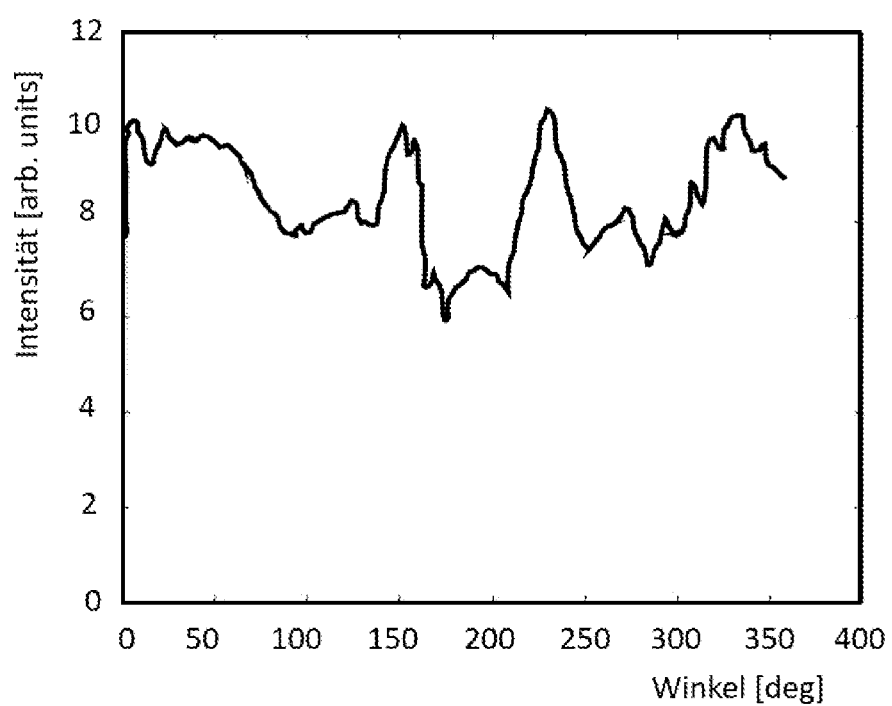
FIG. 3 shows a diagram for visualizing the influence of the surface topography of an investigated object.

The diagram shown in FIG. 3 illustrates the basic problems with this procedure. For this purpose, as a test for a completely cooled and hardened circular cylindrical plastic pipe 10, the device shown in FIGS. 1 and 2 was rotated 360° around the plastic pipe 10, wherein in each case terahertz radiation was emitted to the outer surface 16 of the plastic pipe 10 and terahertz radiation reflected from this surface 16 was received, again by the transceiver 20. Assuming that the plastic pipe 10 possesses a largely homogeneous refractive index, the measured intensity amplitude of the reflected terahertz radiation should only be slightly impaired by rotation.

FIG. 3 shows the intensity amplitude of the reflected terahertz radiation actually received by the transceiver 20 over the course of rotation. The intensity of the reflected terahertz radiation is plotted in any given units on the Y-axis, and the angle of rotation of the device, in particular the transceiver 20, is plotted on the X-axis. It is revealed that intensity fluctuations of more than 20% arise which is not explainable from any irregularities in the refractivity index in the material of the plastic pipe. In fact, these fluctuations apparently result from surface properties of the plastic pipe, in particular an irregular surface topography. This causes the angle of incidence and therefore the angle of reflection of the terahertz radiation as well to vary depending on the topography of the surface during the rotation of the transceiver 20, which in turn causes corresponding fluctuations in the received intensity of the reflected terahertz radiation.

To solve this problem, a maximum of the radiation intensity received over the entire rotation can be determined, for example, and this can be used as a basis for calculating the refractive index assuming an angle of incidence of 0°. This evaluation is based on the assumption that the angle of incidence is substantially 0° when the maximum intensity arises.

Other procedures are also possible with the device according to the invention for taking into account an influence by surface properties of the pipe 10, in particular the surface topography of the pipe 10. The transceiver 20 can therefore be swung or spiraled, for example, so that terahertz radiation is emitted to different locations on the outer surface 16 of the pipe 10, and/or at different angles of incidence to the outer surface 16 of the pipe 10. In turn, the maximum can be determined from the received reflected radiation portions and used as a basis for further evaluation to determine the refractive index. The transceiver 20 can have an adjusting apparatus integrated therein for movement.

It is also possible to perform a calibration relative to the pipe 10 being measured with a known reflectivity, preferably a reflectivity of 1. To accomplished this, the surface of the pipe 10 can be provided with a coating having a known reflectivity, preferably a reflectivity of substantially 1, such as a foil coating or spray coating for example after determining the refractive index according to the invention, and the measurement of the reflected terahertz radiation according to the invention can be performed once again. If there is a deviation from the reflected radiation intensity to be expected based on the known reflectivity, this can be taken into account by subsequently calculating to correct the previously determined refractive index.

Since the pipe 10, as shown in FIGS. 1 and 2, is at least partially transparent to the emitted terahertz radiation, and the irradiated terahertz radiation is therefore also reflected at the additional boundary surfaces of the pipe 10 and these additionally reflected radiation portions are also received by the transceiver 20, the device shown in FIGS. 1 and 2 can also be used to determine a mean refractive index over the cross-section of the pipe 10, as for example described in WO 2016/139155 A1 or DE 10 2018 128 248 A1. Reference is made to the cited documents in this regard.

Temperature can also be determined on this basis, for example at the outer surface 16 and/or the inner surface 18 of the pipe 10, or the mean temperature over the cross-section of the pipe 10 as well, as was explained above. To the extent that, for example, the temperature of the outer surface 16 is also measured by a material-independent temperature measuring device such as a pyrometer, a material-independent absolute value for the temperature at the inner surface 18 of the pipe 10 can also be ascertained in the manner explained above.

Moreover, a shrinkage of the pipe 10 during its complete cooling and therefore complete hardening can be deduced from a comparison of the determined mean refractive index with the determined refractive index in the region of the outer surface 16 of the pipe 10.

Based on the refractive indices ascertained in this way, additional geometric parameters of the pipe 10 can be ascertained, for example, by using propagation time measurements of the radiation portions reflected at the different boundary surfaces of the pipe 10. This relates, for example, to the outer diameter indicated in the figures by reference sign 32, or the wall thicknesses of the pipe 10 indicated by reference signs 34, 36. The values determined using the propagation time measurements for the optical wall thicknesses or the optical diameter can be converted using the ascertained values for the refractive index in a manner known per se into the geometric wall thicknesses or diameter.

The device shown in the figures can be permanently installed, for example designed to rotate about the pipe 10, and can also be portable handheld device.

LIST OF REFERENCE SIGNS

10 Object/pipe
12 Wall

14 Hollow space
16 Outer surface
18 Inner surface
20 Transceiver
21 Biconvex lens
22 Radiation optics
23 Cylindrical lens
25 Optical axis
26 Reflector
28 Line
30 Evaluation apparatus
32 Outer diameter
34 Wall thickness
36 Wall thickness

The invention claimed is:

1. A method for determining a refractive index of a surface region of an object from a production system which has not cooled to an ambient temperature, comprising:
   a) emitting terahertz radiation from a transmitter at an angle of incidence to a surface region of the object;
   b) reflecting the terahertz radiation from the surface region of the object;
   c) receiving the reflected terahertz radiation from the surface region of the object by a receiver; and
   d) determining the refractive index of the surface region using an evaluator in communication with the transmitter and the receiver, wherein the refractive index of the object is determined from a ratio of the emitted and reflected terahertz radiation, and wherein the terahertz radiation is emitted to at least one of: (i) different locations on the surface region of the object; and (ii) different angles of incidence onto the surface region of the object,
   wherein the refractive index is determined from a portion of the reflected terahertz radiation with at least one of: (i) a greatest intensity; (ii) a mean of the received reflected terahertz radiation; and (iii) a quadratic mean of the received reflected terahertz radiation,
   wherein, when determining the refractive index, an influence of surface properties of the object on the reflected terahertz radiation is taken into account.

2. The method according to claim 1, wherein an influence by a surface topography of the object is taken into account when determining the refractive index.

3. The method according to claim 1, further comprising performing a calibration relative to an object with a known reflectivity when determining the refractive index.

4. The method according to claim 3, further comprising coating the surface region of the object with a coating comprising a known reflectivity, preferably a reflectivity of substantially 1.

5. The method according to claim 4, wherein the coating comprises a foil coating or a spray coating.

6. The method according to claim 1, further comprising:
   providing the transmitter for the terahertz radiation; and
   pivoting the transmitter about at least one pivot axis while transmitting the terahertz radiation.

7. The method according to claim 1, further comprising determining a mean refractive index across a cross-section of the object.

8. The method according to claim 7, further comprising determining the mean refractive index from the terahertz radiation emitted to the object and reflected from the object.

9. The method according to claim 8, further comprising determining a shrinkage of the object as the object is cooled to the ambient temperature by comparing the mean refractive index with the refractive index of the surface region of the object.

10. The method according to claim 1, further comprising determining an expected intensity of the terahertz radiation reflected by the object using a finite element method and taking into account the radiation characteristic of a transmitter for the terahertz radiation and a distance of the transmitter to the object.

11. The method according to claim 1, further comprising determining a temperature of the surface region of the object from the determined refractive index in the surface of the object.

12. The method according to claim 1, wherein:
   the object comprises a pipe;
   the terahertz radiation reflected from an inner surface of a wall section of the pipe is also received; and
   a refractive index at the inner surface of the wall section is determined from a ratio of the emitted terahertz radiation and terahertz radiation reflected from the inner surface of the wall section.

13. The method according to claim 12, further comprising using the refractive index at the inner surface of the wall section to determine at least one of: (i) a temperature at the inner surface of the wall section; (ii) a temperature difference between the temperature of the inner surface of the wall section and the temperature of the surface of the object; and (iii) a temperature gradient between the temperature of the inner surface of the wall section and the temperature of the surface of the object.

14. The method according to claim 1, wherein the object comprises a strand-like or plate-like plastic object coming from an extrusion system.

15. The method according to claim 1, wherein the terahertz radiation comprises a pulsed terahertz radiation or FMCW terahertz radiation.

16. A device for determining a refractive index of a surface region of an object coming from a production system which has not cooled to ambient temperature, comprising:
   a transmitter configured to transmit a terahertz radiation at an angle of incidence to the surface region of the object;
   a receiver configured to receive the terahertz radiation reflected from the surface region of the object;
   an evaluation apparatus in electrical communication with the transmitter and receiver, the evaluation apparatus configured to determine a refractive index of the surface region of the object from a ratio of the transmitted and the terahertz radiation reflected from the surface region of the object;
   an adjusting apparatus operatively coupled to the transmitter and configured to adjust at least one of: (i) a location on the surface region of the object to transmit the terahertz radiation;
   and (ii) the angle of incidence to the surface region of the object at which to transmit the terahertz radiation, wherein the receiver is structured to receive the terahertz radiation reflected from the surface region of the object, and the evaluation apparatus is structured to determine the refractive index from a portion of the reflected terahertz radiation with a greatest intensity, wherein the refractive index is determined from a portion of the reflected terahertz radiation with at least one of: (i) a greatest intensity; (ii) a mean of the received reflected terahertz radiation;
   and (iii) a quadratic mean of the received reflected terahertz radiation, wherein the refractive index is determined taking into account an influence of surface properties of the object on a portion of the reflected terahertz radiation.

17. The device according to claim 16, wherein the adjusting apparatus comprises an apparatus configured to pivot the transmitter around at least one pivot axis.

18. The device according to claim 16, wherein the object comprises a pipe and the receiver is configured to receive terahertz radiation reflected by an inner surface of a wall section of the pipe, and wherein the evaluation apparatus is configured to use a portion of reflected terahertz radiation and a known angle of incidence to determine the refractive index at the inner surface of the wall section.

19. The device according to claim 18, further comprising a material-independent temperature measuring device apparatus configured to measure the temperature of the surface region of the object, wherein the evaluation apparatus is configured to determine a temperature at the inner surface of the wall section from the measured temperature and a temperature difference between the temperature of the inner surface of the wall section and the temperature of the surface of the object.

20. The device according to claim 16, wherein the device comprises a hand-held device.

21. The device according to claim 16, wherein the terahertz radiation comprises a pulsed terahertz radiation or FMCW terahertz radiation.

* * * * *